(12) United States Patent
Han

(10) Patent No.: US 12,709,810 B2
(45) Date of Patent: Aug. 18, 2026

(54) METHOD FOR OPERATING AN ELECTROLYZER FOR HYDROGEN PRODUCTION

(71) Applicant: BATTELLE SAVANNAH RIVER ALLIANCE, LLC, Aiken, SC (US)

(72) Inventor: Kai D. Han, Evans, GA (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 743 days.

(21) Appl. No.: 18/102,144

(22) Filed: Jan. 27, 2023

(65) Prior Publication Data

US 2024/0254634 A1 Aug. 1, 2024

(51) Int. Cl.

*C25B 1/042* (2021.01)
*C25B 15/021* (2021.01)
*H01M 8/0656* (2016.01)
*H01M 16/00* (2006.01)

(52) U.S. Cl.

CPC ............ *C25B 1/042* (2021.01); *C25B 15/021* (2021.01); *H01M 8/0656* (2013.01); *H01M 16/003* (2013.01); *H01M 2300/0071* (2013.01)

(58) Field of Classification Search

CPC ........................................................ C25B 1/04
See application file for complete search history.

(56) References Cited

U.S. PATENT DOCUMENTS 6,521,205 B1 2/2003 Beck
7,241,522 B2 7/2007 Moulthrop, Jr. et al.
8,210,214 B2 7/2012 Casey et al.
8,757,223 B2 6/2014 Uemura
9,464,357 B2 10/2016 Herold et al.
9,735,332 B2 8/2017 Jeon
2016/0083855 A1* 3/2016 Herold .................... C25B 15/08 205/628

FOREIGN PATENT DOCUMENTS

CN 114719179 A 7/2022
JP 2007309375 A 11/2007
WO WO 2016/186762 A1 11/2016

OTHER PUBLICATIONS

Chen et al., "Numerical investigation of the vortex tube performance in novel precooling methods in the hydrogen fueling station", International Journal of Hydrogen Energy, vol. 46, Issue 7, Jan. 27, 2021, pp. 5548-5555.
Lagrandeur et al., "Preheating hydrogen using vortex tubes for improved cold start of hydrogen fuel cell electrical vehicles", 2021 World Fuel Cell Conference, Aug. 2021, 3 pages.
Public Summary "Hyper H2-REFUEL", School of Mechanical and Materials Engineering, Pullman, WA, 6 pages.

* cited by examiner

*Primary Examiner* — Hosung Chung
(74) *Attorney, Agent, or Firm* — Dority & Manning, P.A.

(57) ABSTRACT

A method for operating an electrolyzer to produce hydrogen is provided. The method includes providing a compressed gas stream to a vortex tube to generate a cold stream and a hot stream; heating a fluid or a gas with the hot stream from the vortex tube to produce a heated fluid or a heated gas; and providing the heated fluid or heated gas to an electrolyzer. Electrolyzer systems and other methods for operating an electrolyzer are also provided.

19 Claims, 6 Drawing Sheets

METHOD FOR OPERATING AN ELECTROLYZER FOR HYDROGEN PRODUCTION

FEDERAL RESEARCH STATEMENT

This invention was made with government support under Contract No. 89303321CEM000080 awarded by the U.S. Department of Energy. The government has certain rights in the invention.

FIELD

The present disclosure relates generally to apparatuses, systems, and methods for operating an electrolyzer for hydrogen production.

BACKGROUND

Hydrogen gas is utilized in a wide variety of industries. Hydrogen can be used as a propellant, an atmosphere, a carrier gas, a diluents gas, a fuel component for combustion reactions, a fuel for fuel cells, as well as a reducing agent in numerous chemical reactions and processes. Furthermore, hydrogen can be used as a fuel for power generation because it is renewable, abundant, efficient, and unlike other alternatives, produces zero emissions. Hydrogen gas can be produced via electrolysis. Electrolysis is an option for carbon-free hydrogen production from renewable and nuclear resource. Electrolysis is the process of utilizing electricity to split water into hydrogen and oxygen and the reaction takes place in an electrolyzer.

Electrolysis processes for making hydrogen, especially large scale amounts of hydrogen, utilize significant amounts of energy, which is costly and drains energy resources. As such, improved methods for making hydrogen that consume less energy are needed.

SUMMARY

Aspects and advantages of embodiments of the present disclosure will be set forth in part in the following description, or may be learned from the description, or may be learned through practice of the embodiments.

One example aspect of the present disclosure is directed to a method for operating an electrolyzer to produce hydrogen. The method includes providing a compressed gas stream to a vortex tube to generate a cold stream and a hot stream; heating a fluid or a gas with the hot stream from the vortex tube to produce a heated fluid or a heated gas; and providing the heated fluid or heated gas to an electrolyzer.

Another example aspect of the present disclosure is directed to a method for operating an electrolyzer to produce hydrogen. The method includes providing a first compressed hydrogen stream from a hydrogen storage tank to a vortex tube to generate a cold hydrogen stream and a hot hydrogen stream; heating a fluid with the hot hydrogen stream to form a heated fluid; providing the heated fluid to an electrolyzer; and after forming the heated fluid, storing the hot hydrogen stream in the hydrogen storage tank.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
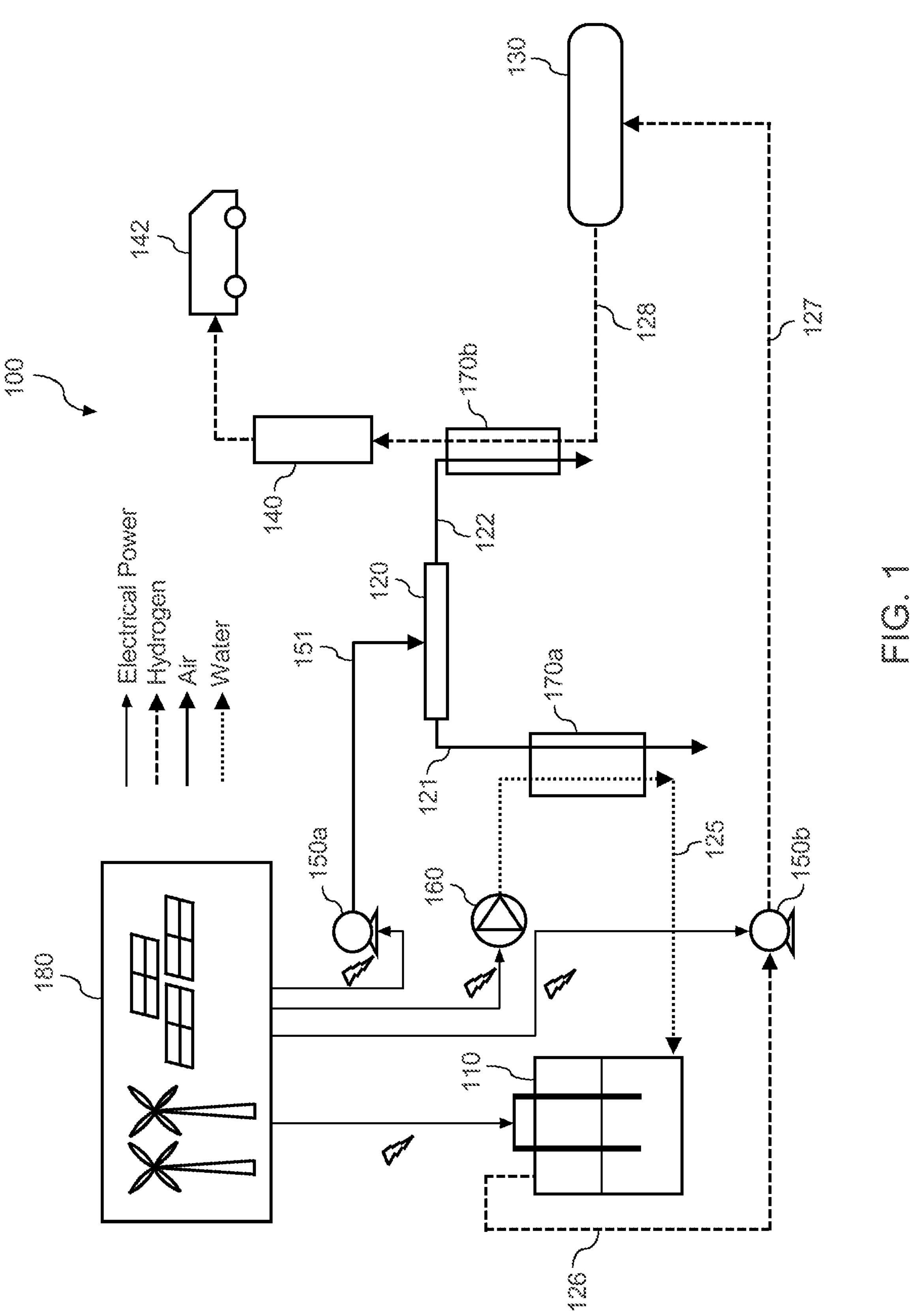
FIG. 1 depicts a schematic of an example system including an electrolyzer for producing hydrogen according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Global warming, which is caused by greenhouse gases such as carbon dioxide ($CO_2$), methane, nitrous oxide, and hydrofluorocarbons is a clear and present danger to humankind. Hydrogen as an alternative vehicle motive power source draws attention to the transportation section, which accounts for 27% of total U.S. greenhouse gas emissions. Reacting hydrogen with oxygen in a fuel cell to power electric motors or burning hydrogen in an internal combustion engine are being considered because hydrogen powered vehicles have several benefits including long range distances on a single tank, no greenhouse gas emission during consumption phase, no efficiency deterioration in cold weather and a relatively short refuel time.

The use of fossil fuels has contributed significantly to carbon dioxide ($CO_2$) production, which can have devastating effects on our environment. Much of the $CO_2$ emissions come from fossil fuel combustion in vehicles. As such, there are new efforts to search for new technologies to reduce consumption of fossil fuels, especially in vehicles. Accordingly, hydrogen may be used as a fuel source to replace fossil fuels. Hydrogen is clean, safe, and pollution risks are minimal. Further, hydrogen energy does not product radioactivity and its contribution to the greenhouse gas effect is minimal.

While hydrogen is one of the most abundant elements on earth it is often found with other elements such as water and hydrocarbons. As such, the availability of pure hydrogen gas is limited. Electrolysis can be used to separate hydrogen and oxygen from water molecules. Large scale electrolyzers can be utilized in order to produce large amounts of hydrogen that can then be used as fuel, for instance to fuel vehicles. However, electrolysis processes can be inefficient, yielding only about 5% of hydrogen due to the high consumption of electrical energy required to separate the water molecule, because water is a very stable molecule. Further, power used to run the electrolyzers can come from either renewable (e.g., solar, wind, etc.) or non-renewable (e.g., fossil fuels) sources.

Accordingly, example aspects of the present disclosure are directed to methods for producing hydrogen that improve the energy efficiency of an electrolyzer, which can be used in particular for producing hydrogen for a hydrogen filling station. For instance, the present method utilizes a vortex tube to produce a cold stream and a hot stream. The hot stream from the vortex tube is utilized to heat up fluid (e.g., water) used in the electrolyzer, which increases the efficiency of the electrolyzer and decreases power consumption by the electrolyzer.

Variations and modifications can be made to these example embodiments of the present disclosure. As used in the specification, the singular forms "a," "and," and "the" include plural referents unless the context clearly dictates otherwise. The use of "first," "second," "third," etc., are used as identifiers and are not necessarily indicative of any ordering, implied or otherwise. Those of ordinary skill in the art, using the disclosures provided herein, will understand that example aspects of the present disclosure can be used with any suitable electrolyzer. The use of the term "about" in conjunction with a numerical value refers to within 20% of the stated numerical value.

As used herein the term "fluid" refers to a substance in any chemical state and is not limited to only fluid substances. For instance, fluid can include gases, liquids, semi-solids, emulsions, solids, etc. and combinations thereof.

Example embodiments of a hydrogen production system will now be discussed. FIG. 1 illustrates an example hydrogen production system 100 that can be used to produce hydrogen according to example embodiments of the present disclosure. As illustrated, the system 100 includes an electrolyzer 110, a vortex tube 120, a hydrogen storage tank 130, a dispenser 140, one or more air compressors 150, one or more water pumps 160, and one or more heat exchangers 170. As shown, an air compressor 150 can be used to provide a compressed gas 151 to the vortex tube 120. The compressed gas 151 can include any gas or gas mixture. In embodiments, the compressed gas stream can include air or hydrogen. The vortex tube 120 utilizes the compressed gas 151 to generate a hot stream 121 and a cold stream 122.

Figure 2:
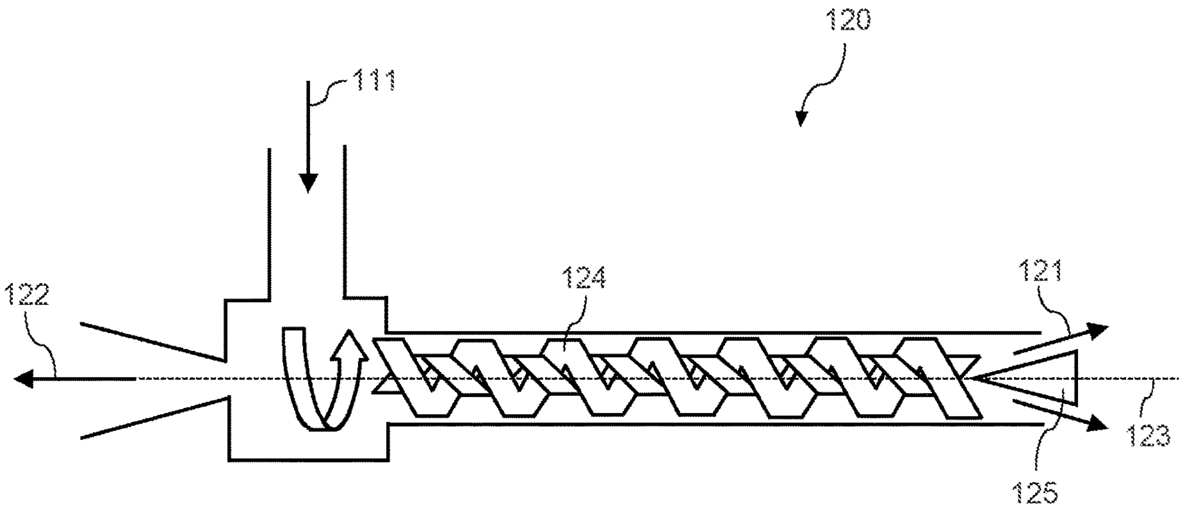
FIG. 2 depicts an example vortex tube according to example aspects of the present disclosure.

Referring now to FIG. 2, an example vortex tube 120 is shown, however, suitable vortex tubes 120 are known by those of skill in the art. Compressed fluid 111 (e.g., air or gas) is supplied to the vortex tube 120. Inside the vortex tube 120, the fluid 111 rotates around an axis 123 (like a tornado) forming a vortex 124. The vortex tube 120 forms the cold stream 122 and the hot stream 121 by forcing the compressed fluid 111 through a generation chamber which spins the air centrifugally along the inner walls of the vortex tube 120 at a high rate of speed (e.g., 1,000,000 RPM) toward a control valve 125. A percentage of the hot, high-speed gas is permitted to exit at one end of the vortex tube 120 via a control valve 125 forming the hot stream 121. The remainder of the (now slower) gas stream is forced to counterflow up through the center of the high-speed gas stream, giving up heat, through the center of the generation chamber finally exiting through the opposite end of the vortex tube 120 as extremely cold air forming the cold stream 122. The control valve 125 located in the hot exhaust end can be used to adjust the temperature drop and rise for the vortex tube 120. The vortex tube 120 is capable of generating a cold stream 122 having a temperature of from about −50° C. to about 0° C. The vortex tube 120 is also capable of generating a hot stream 121 having a temperature of from about 100° C. to about 200° C. The vortex tube 120 is capable of generating a cold stream 122 having a temperature drop in the range of from about 15° C. to about 70° C. as compared to the compressed gas stream entering the vortex tube. The vortex tube 120 is also capable of generating a hot stream 121 having a temperature increase in the range of 10° C. and 110° C. as compared to the compressed gas stream entering the vortex tube. For instance, the temperature decrease for the cold stream 122 and/or the hot stream 121 can be adjusted via the control valve 125 as illustrated in FIG. 2.

The vortex tube 120 can be configured such that a certain amount of the volume of compressed gas 151 that enters the vortex tube 120 exits as either the hot stream 121 or the cold stream 122. For instance, in order to increase electrolyzer efficiency, a larger volume amount of compressed gas 151 can form the hot stream 121. In embodiments, from about 50 vol. % to about 95 vol. % of the compressed gas 151 can form the hot stream 121, such as from about 55 vol. % to about 90 vol. %, such as from about 60 vol. % to about 85 vol. %, such as from about 65 vol. % to about 80 vol. %, such as from about 70 vol. % to about 75 vol. %. In one embodiment, about 80 vol. % of the of the compressed gas 151 forms the hot stream 121. Notably, a smaller volume amount of compressed gas 151 is used to form the cold stream 122. For instance, from about 5 vol. % to about 50 vol. % of the compressed gas 151 is used to form the cold stream 122, such as from about 10 vol. % to about 45 vol. %, such as from about 15 vol. % to about 40 vol. %, such as from about 20 vol. % to about 35 vol. %, such as from about 25 vol. % to about 30 vol. %. In one embodiment, about 20 vol. % of the compressed gas 151 is used to form the cold stream 122.

While only a single vortex tube 120 is shown, the disclosure is not so limited, indeed one or more, such as a plurality of, vortex tubes 120 can be utilized in accordance with the present disclosure. For instance, as a hot stream 121 is pulled from a vortex tube 120 the cold stream 122 can be routed to yet another vortex tube (not shown) in order to generate additional hot streams 122 and cold streams 121. The additional hot streams 122 and cold streams 121 from additional vortex tubes can be utilized to heat or cool other fluids in the system or can be stored for storage or dispensed. Multiple vortex tubes 120 can be connected in series or in parallel (not shown).

The hot stream 121 is provided to a heat exchanger **170*a* to heat fluid (e.g., water) that is used in the electrolyzer 110. For instance, cold or ambient temperature fluid can be pumped into the heat exchanger 170*a* via any suitable pump 160. Once within the heat exchanger 170*a*, the fluid exchanges heat with the hot stream 121, thus raising the temperature of the fluid to create a heated fluid 125, while subsequently lowering the temperature of the hot stream 121. For instance, within the heat exchanger 170*a*, the heated fluid can be heated to a temperature ranging from about 40° ° C. to about 150° C. and can enter the electrolyzer 110 at such a temperature. The hot stream 121 exits the heat exchanger 170*a*** at a lower temperature and can be stored in any suitable storage tank (not shown) or discharged to the ambient environment as desired.

As noted, heated fluid 125 can be provided to an electrolyzer 110 to produce hydrogen. Operation of the electrolyzer 110 produces a hydrogen stream 126 that can be further treated and dispensed. The electrolyzer 110 can include any suitable electrolyzer. In embodiments, the electrolyzer 110 includes a proton exchange membrane (PEM) electrolyzer. For instance, a PEM electrolyzer includes a proton exchange membrane (PEM), which is contacted on both sides by porous platinum electrodes (anode and cathode). During operation of a high-pressure electrolyzer based on PEM technology, two separate water circuits, namely an anode-side and a cathode-side water circuit, are realized. An external voltage is applied to the electrodes and water is supplied to the anode side of the electrolyzer. Through the catalytic effect of the platinum the water on the anode side is broken down. This produces oxygen, free electrons and positively charged hydrogen ions $H^+$. The hydrogen ions $H^+$ diffuse through the proton exchange membrane (PEM) to the cathode side, where they combine with the electrons from the external circuit to form hydrogen molecules $H_2$.

In other embodiments, the electrolyzer 110 is a solid oxide fuel cell. Solid oxide fuel cells, also known as ceramic fuel cells, present an environmentally friendly alternative to mainstream electrical energy production processes involving the combustion of fossil fuels. Solid oxide fuel cells enable the catalytic conversion of chemical energy stored in hydrogen into electrical energy without the concomitant release of greenhouse gases. The generation of electrical current by a solid oxide fuel cell using a hydrogen fuel results in the production of water as opposed to the production carbon dioxide, nitrous oxides, and/or sulfur dioxides associated with the combustion of fossil fuels.

In addition to hydrogen, solid oxide fuel cells are operable to function on a wide variety of fuel sources. Fuel sources in addition to hydrogen include hydrocarbons such as methane, natural gas, and diesel fuel. Hydrocarbon fuel sources are reformed into hydrogen for use with solid oxide fuel cells. Hydrocarbon reforming can be administered prior to entry into the fuel electrode or can be administered at the fuel electrode of a solid oxide fuel cell. The ability to function on a wide variety of fuels distinguishes solid oxide fuel cells from other fuel cells which lack the ability to operate on various fuels. Furthermore, the ability of solid oxide fuel cells to administer hydrocarbon feedstock reformation frees such fuel cells from the limitations associated with hydrogen production and distribution.

Solid oxide fuel cells operate at high temperatures ranging from about 800° C. to 1000° C. As a result of high operating temperatures, as such, significant amounts of power may need to be provided to the solid oxide fuel cell in order to facilitate catalytic conversion therein. For instance, in the present disclosure, water is provided to the solid oxide fuel cell so that hydrogen can be produced. The water entering the solid oxide fuel cell must be at a certain temperature in order to facilitate catalytic conversion in the fuel cell. Notably, as disclosed the hot stream 121 exiting the vortex tube 120 can be utilized to heat water, steam, or other reagents that are then supplied to the solid oxide fuel cell.

Operation of the electrolyzer 110 produces a hydrogen stream 126 (e.g., a low pressure hydrogen stream) that can be stored in a hydrogen storage tank 130. One or more compressors **150*b* can be used to compress the hydrogen stream 126 to form a high pressure hydrogen stream 127 that is then stored in the hydrogen storage tank 130. Compressed hydrogen 128 can be supplied from the hydrogen storage tank 130 to a heat exchanger 170*b* to cool the compressed hydrogen 128 prior to dispensing. For instance, the cold stream 122 can be supplied to the vortex tube 120 along with the compressed hydrogen 128 from the hydrogen storage tank 130. Once inside heat exchanger 170*b*, heat from the compressed hydrogen 128 can be transferred to the cold stream 122, effectively cooling the compressed hydrogen 128 and increasing the temperature of the cold stream 122. Thus, the heat exchanger 170*b* can utilize the cold stream 122 from the vortex tube 120 to cool the compressed hydrogen 128. Once cooled, the compressed hydrogen 128 can be dispensed by dispenser 140. For instance, the dispenser 140 can dispense cooled, compressed hydrogen 128 to a vehicle 142**.

Different components of the system 100 can be powered by a power source 180. For instance, the power source 180 can include an electric power source. The electric power source can include a renewable power source, such wind energy power or solar energy power. The power source 180 can be used to provide power to the compressors 150, pumps 160, electrolyzer(s) 110, heat exchangers 170, or dispenser(s) 140 as needed. Notably, the power source 180 can be used to power the electrolyzer 110. Given that fluid entering the electrolyzer is heated with the hot stream 121 from the vortex tube 120, less power is required of the power source 180 in order to operate the electrolyzer 110. Further, the power source 180 can include a source of green energy power (e.g., wind energy or solar energy) and thus, production of hydrogen according to the present disclosure can be green energy hydrogen production.

Figure 3:
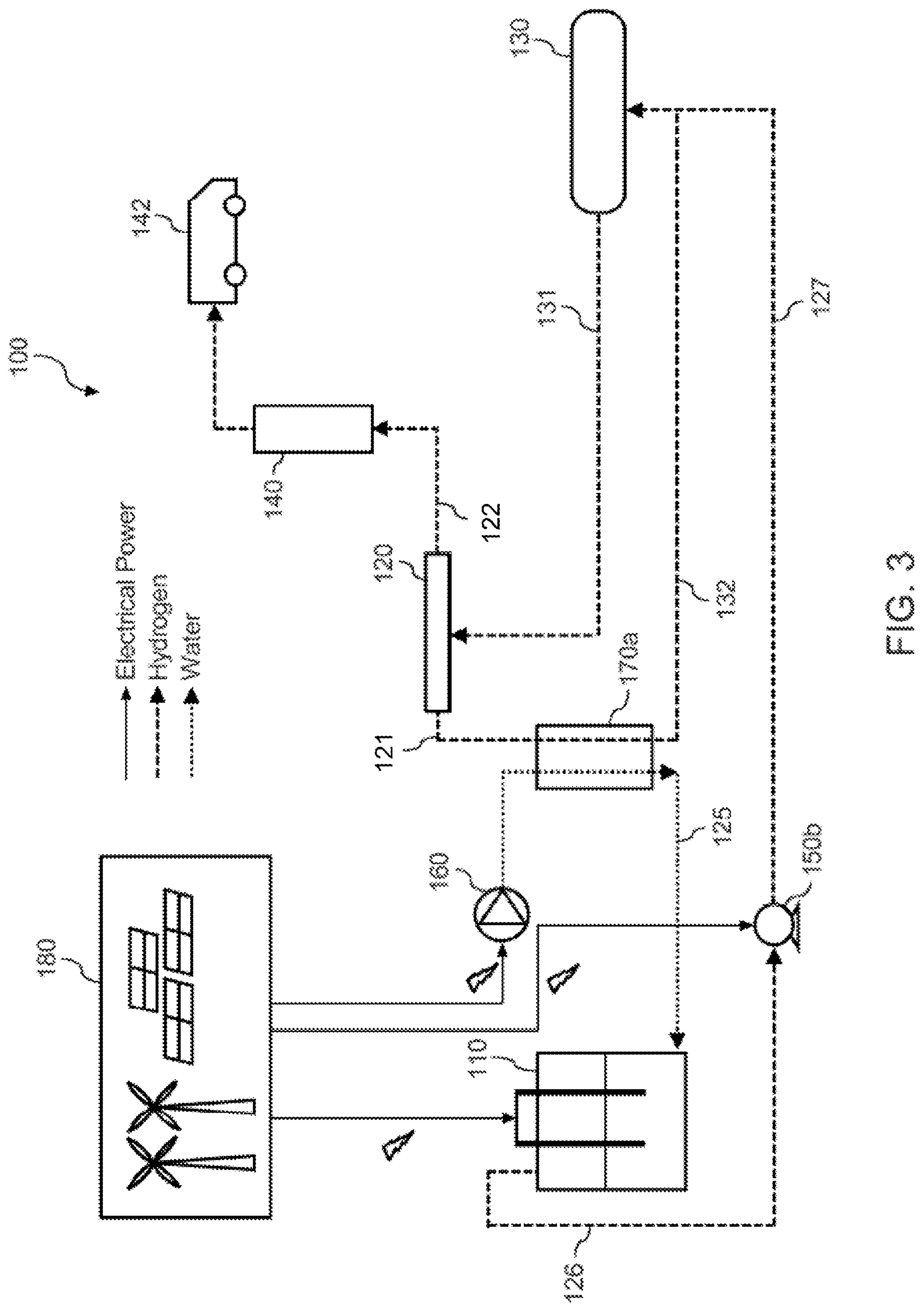
FIG. 3 depicts a schematic of an example system including an electrolyzer for producing hydrogen according to example aspects of the present disclosure.

Now referring to FIG. 3, another example of a hydrogen production system 200 will now be discussed. FIG. 2 illustrates an example hydrogen production system 200 that can be used to produce hydrogen according to example embodiments of the present disclosure. As illustrated, the system 100 includes an electrolyzer 110, a vortex tube 120, a hydrogen storage tank 130, a dispenser 140, one or more air compressors 150, one or more water pumps 160, and one or more heat exchangers 170. As shown in FIG. 3, a compressed hydrogen stream 131 is provided to the vortex tube from hydrogen tank 130. The vortex tube 120 utilizes the compressed hydrogen stream 131 to generate a hot stream 121 and a cold stream 122, each of the hot stream 121 and the cold stream 122 including hydrogen.

Referring again to FIG. 2, an example vortex tube 120 is shown, however, suitable vortex tubes 120 are known by those of skill in the art. Compressed fluid 111 (e.g., air or gas) is supplied to the vortex tube 120. Inside the vortex tube 120, the fluid 111 rotates around an axis 123 (like a tornado) forming a vortex 124. The vortex tube 120 forms the cold stream 122 and the hot stream 121 by forcing the compressed fluid 111 through a generation chamber which spins the air centrifugally along the inner walls of the vortex tube 120 at a high rate of speed (e.g., 1,000,000 RPM) toward a control valve 125. A percentage of the hot, high-speed gas is permitted to exit at one end of the vortex tube 120 via a control valve 125 forming the hot stream 121. The remainder of the (now slower) gas stream is forced to counterflow up through the center of the high-speed gas stream, giving up heat, through the center of the generation chamber finally exiting through the opposite end of the vortex tube 120 as extremely cold air forming the cold stream 122. The control valve 125 located in the hot exhaust end can be used to adjust the temperature drop and rise for the vortex tube 120. The vortex tube 120 is capable of generating a cold stream 122 having a temperature of from about −50° C. to about 0° C. The vortex tube 120 is also capable of generating a hot stream 121 having a temperature of from about 100° C. to about 200° C. The vortex tube 120 is capable of generating a cold stream 122 having a temperature drop in the range of from about 15° C. to about 70° C. as compared to the compressed gas stream entering the vortex tube. The vortex tube 120 is also capable of generating a hot stream 121 having a temperature increase in the range of 10° C. and 110° C. as compared to the compressed gas stream entering the vortex tube. For instance, the temperature decrease for the cold stream The vortex tube 120 can be configured such that a certain amount of the volume of compressed hydrogen stream 131 that enters the vortex tube 120 exits as either the hot stream 121 or the cold stream 122. For instance, in order to increase electrolyzer efficiency, a larger volume amount of the compressed hydrogen stream 131 can form the hot stream 121. In embodiments, from about 50 vol. % to about 95 vol. % of the compressed hydrogen stream 131 can form the hot stream 121, such as from about 55 vol. % to about 90 vol. %, such as from about 60 vol. % to about 85 vol. %, such as from about 65 vol. % to about 80 vol. %, such as from about 70 vol. % to about 75 vol. %. In one embodiment, about 80 vol. % of the of the compressed hydrogen stream 131 forms the hot stream 121. Notably, a smaller volume amount of compressed hydrogen stream 131 can be used to form the cold stream 122. For instance, from about 5 vol. % to about 50 vol. % of the compressed hydrogen stream 131 is used to form the cold stream 122, such as from about 10 vol. % to about 45 vol. %, such as from about 15 vol. % to about 40 vol. %, such as from about 20 vol. % to about 35 vol. %, such as from about 25 vol. % to about 30 vol. %. In one embodiment, about 20 vol. % of the compressed hydrogen stream 131 is used to form the cold stream 122.

While only a single vortex tube 120 is shown, the disclosure is not so limited, indeed one or more, such as a plurality of, vortex tubes 120 can be utilized in accordance with the present disclosure. For instance, as a hot stream 121 is pulled from a vortex tube 120 the cold stream 122 can be routed to yet another vortex tube (not shown) in order to generate additional hot streams 122 and cold streams 121. The additional hot streams 122 and cold streams 121 from additional vortex tubes can be utilized to heat or cool other fluids in the system or can be stored for storage or dispensed.

The hot stream 121 is provided to a heat exchanger 170*a* to heat fluid (e.g., water) that is used in the electrolyzer 110. For instance, cold or ambient temperature fluid can be pumped into the heat exchanger 170*a* via any suitable pump 160. Once within the heat exchanger 170*a*, the fluid exchanges heat with the hot stream 121, thus raising the temperature of the fluid to create a heated fluid 125, while subsequently lowering the temperature of the hot stream 121. For instance, within the heat exchanger 170*a*, the heated fluid can be heated to a temperature ranging from about 40° ° C. to about 150° C. and can enter the electrolyzer 110 at such a temperature.

As noted, heated fluid 125 can be provided to an electrolyzer 110 to produce hydrogen. Operation of the electrolyzer 110 produces a hydrogen stream 126 that can be further treated and dispensed. The electrolyzer 110 can include any suitable electrolyzer. In embodiments, the electrolyzer 110 includes a proton exchange membrane (PEM) electrolyzer. For instance, a PEM electrolyzer includes a proton exchange membrane (PEM), which is contacted on both sides by porous platinum electrodes (anode and cathode). During operation of a high-pressure electrolyzer based on PEM technology, two separate water circuits, namely an anode-side and a cathode-side water circuit, are realized. An external voltage is applied to the electrodes and water is supplied to the anode side of the electrolyzer. Through the catalytic effect of the platinum the water on the anode side is broken down. This produces oxygen, free electrons and positively charged hydrogen ions $H^+$. The hydrogen ions $H^+$ diffuse through the proton exchange membrane (PEM) to the cathode side, where they combine with the electrons from the external circuit to form hydrogen molecules $H_2$.

In other embodiments, the electrolyzer 110 is a solid oxide fuel cell. Solid oxide fuel cells, also known as ceramic fuel cells, present an environmentally friendly alternative to mainstream electrical energy production processes involving the combustion of fossil fuels. Solid oxide fuel cells enable the catalytic conversion of chemical energy stored in hydrogen into electrical energy without the concomitant release of greenhouse gases. The generation of electrical current by a solid oxide fuel cell using a hydrogen fuel results in the production of water as opposed to the production carbon dioxide, nitrous oxides, and/or sulfur dioxides associated with the combustion of fossil fuels.

In addition to hydrogen, solid oxide fuel cells are operable to function on a wide variety of fuel sources. Fuel sources in addition to hydrogen include hydrocarbons such as methane, natural gas, and diesel fuel. Hydrocarbon fuel sources are reformed into hydrogen for use with solid oxide fuel cells. Hydrocarbon reforming can be administered prior to entry into the fuel electrode or can be administered at the fuel electrode of a solid oxide fuel cell. The ability to function on a wide variety of fuels distinguishes solid oxide fuel cells from other fuel cells which lack the ability to operate on various fuels. Furthermore, the ability of solid oxide fuel cells to administer hydrocarbon feedstock reformation frees such fuel cells from the limitations associated with hydrogen production and distribution.

Solid oxide fuel cells operate at high temperatures ranging from about 800° C. to 1000° C. As a result of high operating temperatures, as such, significant amounts of power may need to be provided to the solid oxide fuel cell in order to facilitate catalytic conversion therein. For instance, in the present disclosure, water is provided to the solid oxide fuel cell so that hydrogen can be produced. The water entering the solid oxide fuel cell must be at a certain temperature in order to facilitate catalytic conversion in the fuel cell. Notably, as disclosed the hot stream 121 exiting the vortex tube 120 can be utilized to heat water, steam, or other reagents that are then supplied to the solid oxide fuel cell.

Operation of the electrolyzer produces a hydrogen stream 126 (e.g., a low pressure hydrogen stream) that can be stored in a hydrogen storage tank 130. One or more compressors 150*b* can be used to compress the hydrogen stream 126 to form a high pressure hydrogen stream 127 that is then stored in the hydrogen storage tank 130. Notably, once the high pressure hydrogen stream 127 is stored in the hydrogen storage tank 130 it can then be dispensed back to the vortex tube 120 for further processing. Further, as noted above, the hot stream 121, containing hot hydrogen, enters the heat exchanger 170*a* to heat fluid utilized in the electrolyzer 110. During heat exchange in heat exchanger 170*a*, the hot stream 122 is cooled forming a warm hydrogen stream 132, which exits the heat exchanger 170*a* and can be supplied to the hydrogen storage tank 130 for further dispensing to the vortex tube 120, as needed.

As noted, the vortex tube 120 forms both a hot stream 121 and a cold stream 122. The cold stream 122 can be provided to a dispenser 140 and can be dispensed accordingly. For instance, as shown, cold hydrogen, provided by the cold stream 122 to the dispenser 140, can be dispensed to a vehicle 142. In such an embodiment, no additional, heat exchangers or compressors are necessary, as the compressed hydrogen forming the cold stream 122 exiting the vortex tube 120 can be dispensed directly via the dispenser 140 as needed.

Different components of the system 100 can be powered by a power source 180. For instance, the power source 180 can include an electric power source. The electric power source can include a renewable power source, such wind energy power or solar energy power. The power source 180 can be used to provide power to the compressors 150, pumps 160, electrolyzer(s) 110, heat exchangers 170, or dispenser(s) 140 as needed. Notably, the power source 180 can be used to power the electrolyzer 110. Given that fluid entering the electrolyzer is heated with the hot stream 121 from the vortex tube 120, less power is required of the power source 180 in order to operate the electrolyzer 110. Further, the power source 180 can include a source of green energy power (e.g., wind energy or solar energy) and thus, production of hydrogen according to the present disclosure can be green energy hydrogen production.

The systems 100 or 200 as depicted in FIGS. 1 and 3, can further include one or more controllers configured to control operations of the system (not shown). For instance, data from any of the components can be transmitted to one or more processors for further processing. For instance, data from components of the systems can be transferred to a computing device capable of executing one or more programs thereon for processing the data from the components for determining proper functioning of the system component. For instance, in the case of the vortex tube 120, temperature data from each end of the vortex tube 120 can be provided to a computing device. In the event that the cold stream 121 or hot stream 122 are not within an optimal temperature range, the valve on the vortex tube 120 can be adjusted or the amount of compressed hydrogen or gas entering the vortex tube 120 can be adjusted in order to adjust the temperature of the hot stream 121 or the cold stream 122. Similarly, it is contemplated that the flow of the hot stream 121 through heat exchanger **170*a* can be adjusted in order to increase or decrease the temperature of the heated fluid 125 flowing through the heat exchanger 170*a* and entering the electrolyzer 110**. The computing device can include a processor, controller, and/or memory all configured to execute machine readable instructions for processing the data from system components.

Figure 4:
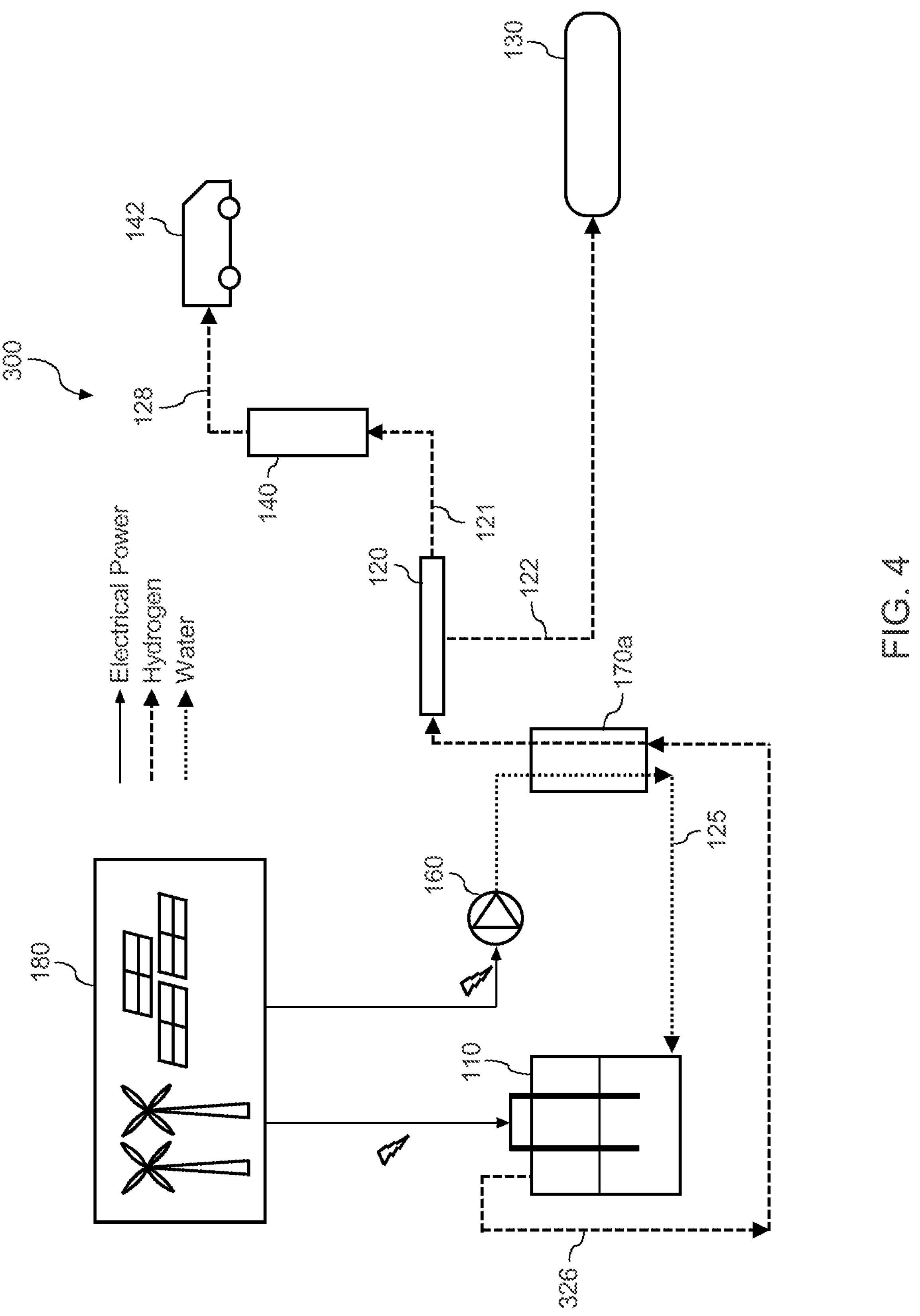
FIG. 4 depicts a schematic of an example system including an electrolyzer for producing hydrogen according to example aspects of the present disclosure.

Now referring to FIG. 4, another example of a hydrogen production system 300 will now be discussed. FIG. 4 illustrates an example hydrogen production system 300 that can be used to produce hydrogen according to example embodiments of the present disclosure. As illustrated, the system 100 includes an electrolyzer 110, a vortex tube 120, a hydrogen storage tank 130, a dispenser 140, one or more water pumps 160, and one or more heat exchangers 170. As shown in FIG. 4, a high pressure hydrogen stream 326 is provided to the vortex tube 120 from the electrolyzer 110. Notably, in such an embodiment, no additional air compressors or air compression is necessary.

In such an embodiment, the electrolyzer 110 as shown can be suitable for performing high-pressure electrolysis and/or supercritical electrolysis. Such processes can produce a high pressure hydrogen stream 326 that can be applied directly to the vortex tube 120 without any additional compression work. For instance, the high pressure hydrogen stream 326 can have a pressure ranging from about 10 megapascal (MPa) to about 25 MPa, such as about 12 MPa to about 20 MPa. In such an embodiment, the high pressure hydrogen stream 326 can be provided to a heat exchanger **170*a* such that it can be cooled by water pumped through the heat exchanger 170*a* via a water pump 160**.

Referring again to FIG. 2, an example vortex tube 120 is shown, however, suitable vortex tubes 120 are known by those of skill in the art. Compressed fluid 111 (e.g., air or gas) is supplied to the vortex tube 120. Inside the vortex tube 120, the fluid 111 rotates around an axis 123 (like a tornado) forming a vortex 124. The vortex tube 120 forms the cold stream 122 and the hot stream 121 by forcing the compressed fluid 111 through a generation chamber which spins the air centrifugally along the inner walls of the vortex tube 120 at a high rate of speed (e.g., 1,000,000 RPM) toward a control valve 125. A percentage of the hot, high-speed gas is permitted to exit at one end of the vortex tube 120 via a control valve 125 forming the hot stream 121. The remainder of the (now slower) gas stream is forced to counterflow up through the center of the high-speed gas stream, giving up heat, through the center of the generation chamber finally exiting through the opposite end of the vortex tube 120 as extremely cold air forming the cold stream 122. The control valve 125 located in the hot exhaust end can be used to adjust the temperature drop and rise for the vortex tube 120. The vortex tube 120 is capable of generating a cold stream 122 having a temperature of from about −50° C. to about 0° C. The vortex tube 120 is also capable of generating a hot stream 121 having a temperature of from about 100° C. to about 200° C. The vortex tube 120 is capable of generating a cold stream 122 having a temperature drop in the range of from about 15° C. to about 70° C. as compared to the compressed gas stream entering the vortex tube. The vortex tube 120 is also capable of generating a hot stream 121 having a temperature increase in the range of 10° C. and 110° C. as compared to the compressed gas stream entering the vortex tube. For instance, the temperature decrease for the cold stream The vortex tube 120 can be configured such that a certain amount of the volume of compressed gas 151 that enters the vortex tube 120 exits as either the hot stream 121 or the cold stream 122. For instance, in order to increase electrolyzer efficiency, a larger volume amount of compressed gas 151 can form the hot stream 121. In embodiments, from about 50 vol. % to about 95 vol. % of the compressed gas 151 can form the hot stream 121, such as from about 55 vol. % to about 90 vol. %, such as from about 60 vol. % to about 85 vol. %, such as from about 65 vol. % to about 80 vol. %, such as from about 70 vol. % to about 75 vol. %. In one embodiment, about 80 vol. % of the of the compressed gas 151 forms the hot stream 121. Notably, a smaller volume amount of compressed gas 151 is used to form the cold stream 122. For instance, from about 5 vol. % to about 50 vol. % of the compressed gas 151 is used to form the cold stream 122, such as from about 10 vol. % to about 45 vol. %, such as from about 15 vol. % to about 40 vol. %, such as from about 20 vol. % to about 35 vol. %, such as from about 25 vol. % to about 30 vol. %. In one embodiment, about 20 vol. % of the compressed gas 151 is used to form the cold stream 122.

While only a single vortex tube 120 is shown, the disclosure is not so limited, indeed one or more, such as a plurality of, vortex tubes 120 can be utilized in accordance with the present disclosure. For instance, as a hot stream 121 is pulled from a vortex tube 120 the cold stream 122 can be routed to yet another vortex tube (not shown) in order to generate additional hot streams 122 and cold streams 121. The additional hot streams 122 and cold streams 121 from additional vortex tubes can be utilized to heat or cool other fluids in the system or can be stored for storage or dispensed. Multiple vortex tubes 120 can be connected in series or in parallel (not shown).

The hot stream 121 can be provided to the storage tank 130 as shown or can be vented to the ambient environment. Heated fluid 125 can be provided to an electrolyzer 110 to produce hydrogen. For instance, heat exchange between the high pressure hydrogen stream 326 and the water in the heat exchanger 170*a* can provide heated fluid 125 for operation of the electrolyzer 110. As noted, operation of the electrolyzer 110 produces a high pressure hydrogen stream 326 that can be further treated or dispensed as desired. The electrolyzer 110 can include any suitable electrolyzer. For instance, the electrolyzer 110 can include a PEM electrolyzer or a solid oxide fuel cell electrolyzer as disclosed hereinabove with reference to FIGS. 1 and 3.

Once the high pressure hydrogen stream 326 is supplied to the vortex tube 120, the cold stream 122 can be provided to a dispenser 140 and dispensed as desired. For instance, the dispenser 140 can dispense cooled, compressed hydrogen 128 to a vehicle 142.

Different components of the system 300 can be powered by a power source 180. For instance, the power source 180 can include an electric power source. The electric power source can include a renewable power source, such wind energy power or solar energy power. The power source 180 can be used to provide power to the pumps 160, electrolyzer(s) 110, heat exchangers 170, or dispenser(s) 140 as needed. Notably, the power source 180 can be used to power the electrolyzer 110. Given that fluid entering the electrolyzer is heated with the high pressure hydrogen stream 326 supplied by the electrolyzer 110, less power is required of the power source 180 in order to operate the electrolyzer 110. Further, the power source 180 can include a source of green energy power (e.g., wind energy or solar energy) and thus, production of hydrogen according to the present disclosure can be green energy hydrogen production.

Figure 5:
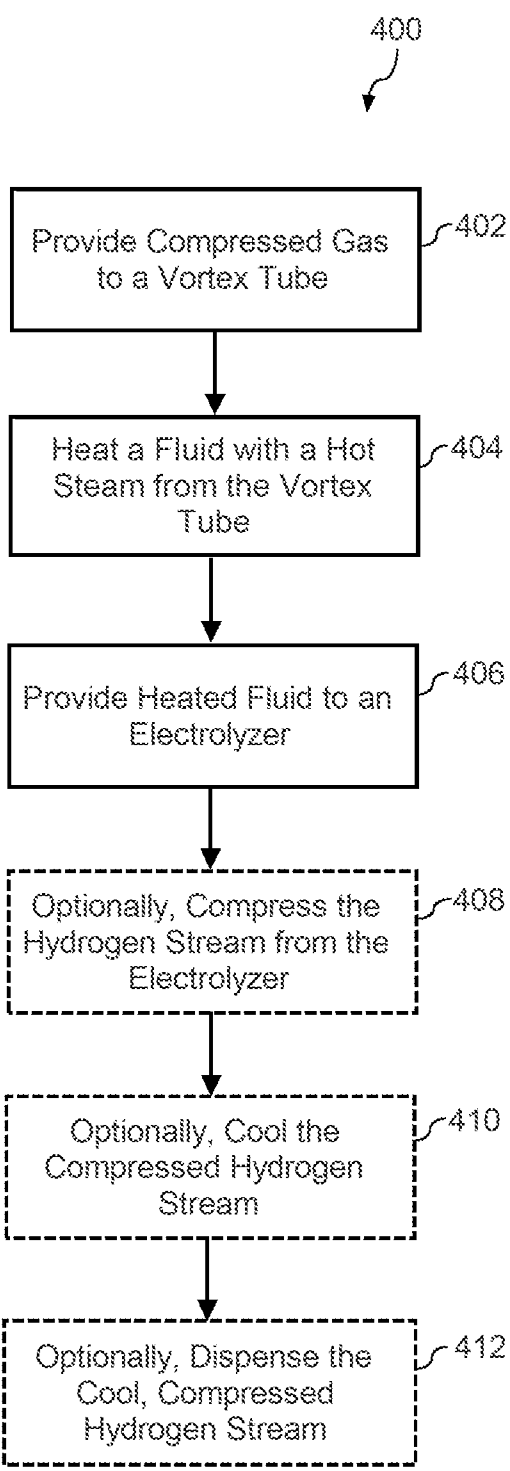
FIG. 5 depicts a flow diagram of an example method for operating an electrolyzer to produce hydrogen according to example embodiments of the present disclosure.

FIG. 5 depicts a flow diagram of one example method (400) according to example aspects of the present disclosure. The method (400) will be discussed with reference to the system 100 of FIG. 1 by way of example. However, the method (400) can be implemented in any suitable system. FIG. 5 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (402), the method can include providing a compressed gas 151 (e.g., a compressed air stream) to a vortex tube 120 to generate a cold stream 122 and a hot stream 121. Inside the vortex tube 120, fluid (air) that rotates around an axis (like a tornado) forming a vortex. The vortex tube 120 the cold stream 122 and the hot stream 121 by forcing compressed gas through a generation chamber which spins the air centrifugally along the inner walls of the vortex tube 120 at a high rate of speed (e.g., 1,000,000 RPM) toward a control valve (not shown). A percentage of the hot, high-speed gas is permitted to exit at one end of the vortex tube 120 via a control valve, forming the hot stream 121. The remainder of the (now slower) gas stream is forced to counterflow up through the center of the high-speed gas stream, giving up heat, through the center of the generation chamber finally exiting through the opposite end of the vortex tube 120 as extremely cold air, forming the cold stream 122. The vortex tube 120 can be capable of generating a cold stream 122 having a temperature of from about −50° C. to about 0° C. The vortex tube 120 is also capable of generating a hot stream 121 having a temperature of from about 100° ° C. to about 200° C. The vortex tube 120 is capable of generating a cold stream 122 having a temperature drop in the range of from about 15° C. to about 70° C. as compared to the compressed gas stream entering the vortex tube. The vortex tube 120 is also capable of generating a hot stream 121 having a temperature increase in the range of 10° C. and 110° C. as compared to the compressed gas stream entering the vortex tube.

The vortex tube 120 can be configured such that a certain amount of the volume of compressed gas 151 that enters the vortex tube 120 exits as either the hot stream 121 or the cold stream 122. For instance, in order to increase electrolyzer efficiency, a larger volume amount of compressed gas 151 can form the hot stream 121. In embodiments, from about 50 vol. % to about 95 vol. % of the compressed gas 151 can form the hot stream 121, such as from about 55 vol. % to about 90 vol. %, such as from about 60 vol. % to about 85 vol. %, such as from about 65 vol. % to about 80 vol. %, such as from about 70 vol. % to about 75 vol. %. In one embodiment, about 80 vol. % of the of the compressed gas 151 forms the hot stream 121. Notably, a smaller volume amount of compressed gas 151 is used to form the cold stream 122. For instance, from about 5 vol. % to about 50 vol. % of the compressed gas 151 is used to form the cold stream 122, such as from about 10 vol. % to about 45 vol. %, such as from about 15 vol. % to about 40 vol. %, such as from about 20 vol. % to about 35 vol. %, such as from about 25 vol. % to about 30 vol. %. In one embodiment, about 20 vol. % of the compressed gas 151 is used to form the cold stream 122.

At (404), the method can include heating a fluid with the hot stream 121 from the vortex tube 120 to produce a heated fluid 125. For example, the hot stream 121 is provided to a heat exchanger 170*a* to heat fluid (e.g., water) that is used in the electrolyzer 110. For instance, cold or ambient temperature fluid can be pumped into the heat exchanger 170*a* via any suitable pump 160. Once within the heat exchanger 170*a*, the fluid exchanges heat with the hot stream 121, thus raising the temperature of the fluid to create a heated fluid 125, while subsequently lowering the temperature of the hot stream 121. For instance, within the heat exchanger 170*a*, the heated fluid can be heated to a temperature ranging from about 40° C. to about 150° C. and can enter the electrolyzer 110 at such a temperature. The hot stream 121 exits the heat exchanger 170*a* at a lower temperature and can be stored in any suitable storage tank (not shown) or discharged to the ambient environment as desired.

At (406), the method can include providing the heated fluid 125 to an electrolyzer 110. As noted, heated fluid 125 can be provided to the electrolyzer 110 to produce hydrogen. For instance, the heated fluid 125 can be provided to electrolyzer 110, where reactions within the electrolyzer can produce hydrogen. As noted hereinabove, the electrolyzer 110 can include any suitable electrolyzer, such as a PEM electrolyzer or a solid oxide fuel cell. The electrolyzer 110 is configured to catalytically convert reagents (e.g., water) to produce hydrogen.

Optionally, at (408) the method can include compressing a hydrogen stream (e.g., low pressure hydrogen stream 126) from the electrolyzer 110 to form a high pressure hydrogen stream 127. For instance, as shown, the hydrogen stream 126 can be compressed with compressor 150*b* forming a high pressure hydrogen stream 127 that can be supplied to and stored in hydrogen storage tank 130.

Optionally, at (410) the method can include cooling compressed hydrogen 128. For instance, compressed hydrogen 128 stored in hydrogen tank 130 can be supplied to a heat exchanger 170*b*. For instance, the cold stream 122 can be supplied to the vortex tube 120 along with the compressed hydrogen 128 from the hydrogen storage tank 130. Once inside heat exchanger 170*b*, heat from the compressed hydrogen 128 can be transferred to the cold stream 122, effectively cooling the compressed hydrogen 128 and increasing the temperature of the cold stream 122. Thus, the heat exchanger 170*b* can utilize the cold stream 122 from the vortex tube 120 to cool the compressed hydrogen 128.

Optionally, at (412) the method can include dispensing a compressed hydrogen stream to a peripheral device. For instance, cooled, compressed hydrogen stored in the dispenser 140 can be dispensed to a vehicle 142.

Figure 6:
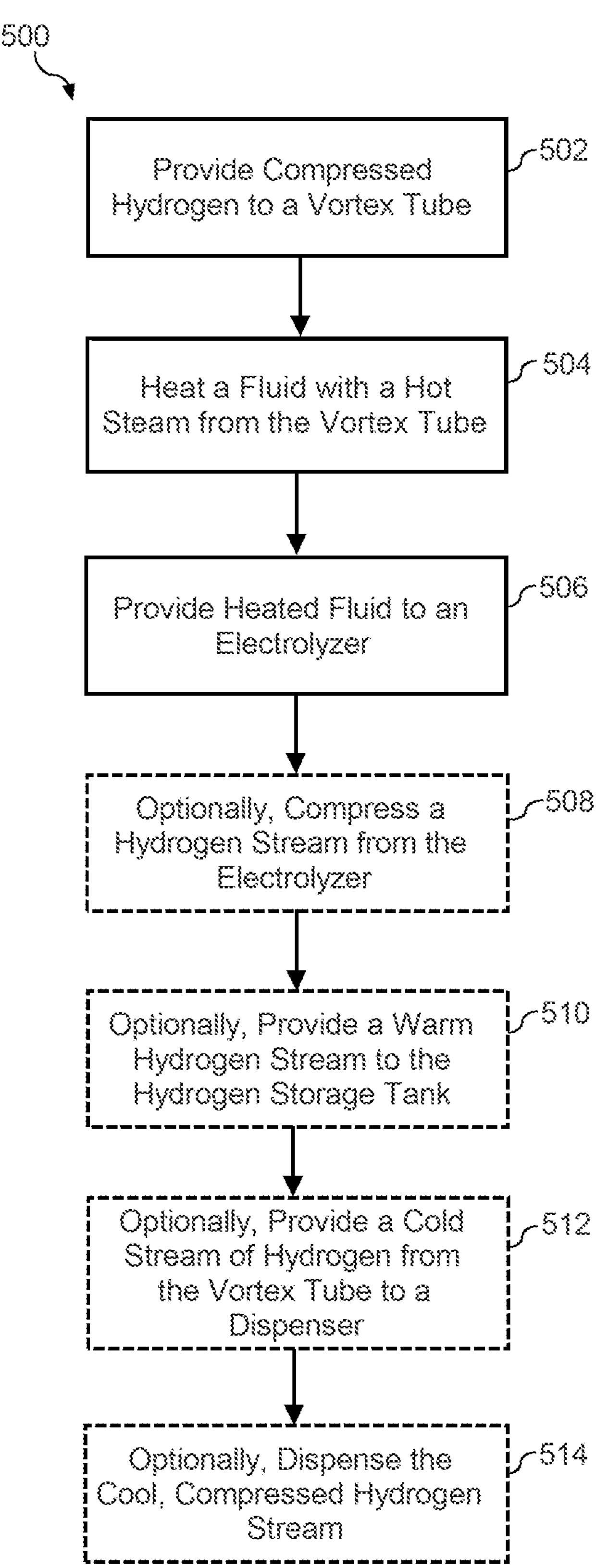
FIG. 6 depicts a flow diagram of an example method for operating an electrolyzer to produce hydrogen according to example embodiments of the present disclosure.

FIG. 6 depicts a flow diagram of one example method (500) according to example aspects of the present disclosure. The method (500) will be discussed with reference to the system 200 of FIG. 3 by way of example. However, the method (500) can be implemented in any suitable system. FIG. 6 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (502), the method can include providing a compressed hydrogen stream 131 to a vortex tube 120 to generate a cold stream 122 and a hot stream 121. Inside the vortex tube 120, fluid (air) that rotates around an axis (like a tornado) forming a vortex. The vortex tube 120 the cold stream 122 and the hot stream 121 by forcing compressed gas through a generation chamber which spins the air centrifugally along the inner walls of the vortex tube 120 at a high rate of speed (e.g., 1,000,000 RPM) toward a control valve (not shown). A percentage of the hot, high-speed gas is permitted to exit at one end of the vortex tube 120 via a control valve, forming the hot stream 121. The remainder of the (now slower) gas stream is forced to counterflow up through the center of the high-speed gas stream, giving up heat, through the center of the generation chamber finally exiting through the opposite end of the vortex tube 120 as extremely cold air, forming the cold stream 122. The vortex tube 120 can be capable of generating a cold stream 122 having a temperature of from about −50° ° C. to about 0° C. The vortex tube 120 is also capable of generating a hot stream 121 having a temperature of from about 100° C. to about 200° C. The vortex tube 120 is capable of generating a cold stream 122 having a temperature drop in the range of from about 15° C. to about 70° C. as compared to the compressed gas stream entering the vortex tube. The vortex tube 120 is also capable of generating a hot stream 121 having a temperature increase in the range of 10° C. and 110° C. as compared to the compressed gas stream entering the vortex tube.

The vortex tube 120 can be configured such that a certain amount of the volume of compressed hydrogen stream 131 that enters the vortex tube 120 exits as either the hot stream 121 or the cold stream 122. For instance, in order to increase electrolyzer efficiency, a larger volume amount of the compressed hydrogen stream 131 can form the hot stream 121. In embodiments, from about 50 vol. % to about 95 vol. % of the compressed hydrogen stream 131 can form the hot stream 121, such as from about 55 vol. % to about 90 vol. %, such as from about 60 vol. % to about 85 vol. %, such as from about 65 vol. % to about 80 vol. %, such as from about 70 vol. % to about 75 vol. %. In one embodiment, about 80 vol. % of the of the compressed hydrogen stream 131 forms the hot stream 121. Notably, a smaller volume amount of compressed hydrogen stream 131 can be used to form the cold stream 122. For instance, from about 5 vol. % to about 50 vol. % of the compressed hydrogen stream 131 is used to form the cold stream 122, such as from about 10 vol. % to about 45 vol. %, such as from about 15 vol. % to about 40 vol. %, such as from about 20 vol. % to about 35 vol. %, such as from about 25 vol. % to about 30 vol. %. In one embodiment, about 20 vol. % of the compressed hydrogen stream 131 is used to form the cold stream 122.

At (504), the method can include heating a fluid with the hot stream 121 from the vortex tube 120 to produce a heated fluid 125. For instance, cold or ambient temperature fluid can be pumped into the heat exchanger 170*a* via any suitable pump 160. Once within the heat exchanger 170*a*, the fluid exchanges heat with the hot stream 121, thus raising the temperature of the fluid to create a heated fluid 125, while subsequently lowering the temperature of the hot stream 121. For instance, within the heat exchanger 170*a*, the heated fluid can be heated to a temperature ranging from about 40° C. to about 150° C. and can enter the electrolyzer 110 at such a temperature.

At (506), the method can include providing the heated fluid 125 to an electrolyzer 110. For instance, heated fluid 125 can be provided to an electrolyzer 110 to produce hydrogen. Operation of the electrolyzer 110 produces a hydrogen stream 126 that can be further treated and dispensed. As noted hereinabove, the electrolyzer 110 can include any suitable electrolyzer, such as a PEM electrolyzer or a solid oxide fuel cell. The electrolyzer 110 is configured to catalytically convert reagents (e.g., water) to produce hydrogen.

Optionally, at (508) the method can include compressing a hydrogen stream 126 (e.g., a low pressure hydrogen stream) from the electrolyzer 110 to form a high pressure hydrogen stream 127. For instance, as shown, the hydrogen stream 126 can be compressed with compressor 150*b* forming a high pressure hydrogen stream 127 that can be supplied to a hydrogen tank 130. Notably, once the high pressure hydrogen stream 127 is stored in the hydrogen storage tank 130 it can then be dispensed back to the vortex tube 120 for further processing.

Optionally, at (510) the method can include providing a warm hydrogen stream 132 to the hydrogen storage tank 130. For instance, the hot stream 121 is provided to the heat exchanger 170*a* to heat fluid that is then transferred to the electrolyzer 110. Thus, a warm hydrogen stream 132 exits the heat exchanger 170*a* and can be transferred to the hydrogen storage tank 130. Notably, in such embodiments, the hydrogen storage tank 130 can store hydrogen exiting from both the electrolyzer 110 and the heat exchanger 170*a*, which can increase operating efficiencies for the system and reduce waste.

Optionally, at (512) the method can include providing a cold stream 122 of hydrogen to a dispenser 140 for dispensing. For instance, since hydrogen from hydrogen tank 130 is supplied to the vortex tube 120, the cold stream 122 includes cold, compressed hydrogen. The cold compressed hydrogen from the cold stream 122 can be provided to a dispenser 140.

Optionally, at (514) the method can include dispensing a compressed hydrogen stream to a peripheral device. For instance, cooled, compressed hydrogen stored in the dispenser 140 can be dispensed to a vehicle 142.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for operating an electrolyzer to produce hydrogen, the method comprising:

providing a compressed gas stream to a vortex tube to generate a cold stream and a hot stream;

heating a fluid or a gas with the hot stream from the vortex tube to produce a heated fluid; and providing the heated fluid to the electrolyzer.

2. The method of claim 1, wherein the fluid comprises water.

3. The method of claim 1, wherein the heated fluid has a temperature of from about 40° C. to about 150° C.

4. The method of claim 1, wherein the hot stream has a temperature of from about 100° C. to about 200° C.

5. The method of claim 1, wherein the cold stream has a temperature of from about −50° C. to about 0° C.

6. The method of claim 1, wherein one or more heat exchangers are used to heat the fluid with the hot stream.

7. The method of claim 1, wherein from about 50 vol. % to about 90 vol. % of the compressed gas forms the hot stream.

8. The method of claim 1, wherein the compressed gas stream comprises hydrogen gas or air.

9. The method of claim 1, further comprising compressing a hydrogen stream from the electrolyzer to form a compressed hydrogen stream.

10. The method of claim 9, further comprising cooling the compressed hydrogen stream with the cold stream from the vortex tube.

11. The method of claim 9, wherein the compressed hydrogen stream is cooled to a temperature of from about −40° C. to about 0° C.

12. A method for operating an electrolyzer to produce hydrogen, the method comprising:

providing a first compressed hydrogen stream from a hydrogen storage tank to a vortex tube to generate a cold hydrogen stream and a hot hydrogen stream;

heating a fluid with the hot hydrogen stream to form a heated fluid;

providing the heated fluid to the electrolyzer; and after forming the heated fluid, storing the hot hydrogen stream in the hydrogen storage tank.

13. The method of claim 12, further comprising compressing a low pressure hydrogen stream from the electrolyzer to form a second compressed hydrogen stream.

14. The method of claim 13, further comprising storing the second compressed hydrogen stream in the hydrogen storage tank.

15. The method of claim 12, further comprising dispensing the cold hydrogen stream.

16. The method of claim 12, wherein the fluid comprises water.

17. The method of claim 12, wherein the heated fluid has a temperature of from about 40° C. to about 150° C.

18. The method of claim 12, wherein the cold hydrogen stream has a temperature of from about −50° C. to about 0° C. and the hot hydrogen stream has a temperature of from about 100° C. to about 200° C.

19. The method of claim 12, wherein from about 50 vol. % to about 90 vol. % of the first compressed hydrogen stream forms the hot hydrogen stream.

* * * * *